US008140852B2

(12) United States Patent
Guenter et al.

(10) Patent No.: US 8,140,852 B2
(45) Date of Patent: Mar. 20, 2012

(54) AUTHENTICATING SERIALIZED COMMODITIES

(75) Inventors: Erich Guenter, Hofheim (DE); Mark Edmund Maresh, Rochester Hills, MI (US); Thomas S. Mazzeo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 12/140,008

(22) Filed: Jun. 16, 2008

(65) Prior Publication Data
US 2009/0313678 A1  Dec. 17, 2009

(51) Int. Cl.
H04L 9/32 (2006.01)
(52) U.S. Cl. .............. 713/179; 713/181; 726/2; 705/56; 705/57
(58) Field of Classification Search .................. None
See application file for complete search history.

(56) References Cited

U.S. PATENT DOCUMENTS

| | | | |
|---|---|---|---|
| 5,694,471 | A | 12/1997 | Chen et al. |
| 6,996,543 | B1 | 2/2006 | Coppersmith et al. |
| 7,222,791 | B2 | 5/2007 | Heilper et al. |
| 7,283,630 | B1 | 10/2007 | Doljack |
| 2002/0188849 | A1* | 12/2002 | Kwan ........................... 713/176 |
| 2007/0194879 | A1* | 8/2007 | Backes et al. .................. 340/5.8 |
| 2009/0083848 | A1* | 3/2009 | Lawlor et al. .................. 726/18 |

FOREIGN PATENT DOCUMENTS

| | | | |
|---|---|---|---|
| EP | 0996928 | | 5/2000 |
| GB | 2342743 | | 4/2000 |
| JP | 2002-528933 | | 9/2002 |
| JP | 2007-166439 | | 6/2007 |
| JP | 2007-249832 | | 9/2007 |
| JP | 2008-046905 | | 2/2008 |
| WO | WO 00/23954 | * | 4/2000 |
| WO | WO 02/33624 | * | 10/2001 |
| WO | 2007213040 A1 | | 10/2007 |
| WO | WO 2007/113040 | | 10/2007 |

OTHER PUBLICATIONS

English translation of JP 2008-046905.*
English translation of JP 2002-528933.*
English translation (AIPN machine translation) of JP application publication No. 2007-249832.*
English translation (AIPN machine translation) of JP application publication No. 2007-166439.*
IBM TDB "Software Serial Number" Original publication date: Dec. 1, 1983; IP.com number: IPCOM000047984D; IP.com publication date: Feb. 8, 2005. Downloaded from http://www.ip.com/pubview/IPCOM000047984D on Dec. 23, 2010.*
Bruce Schneier, Applied Cryptography; John Wiley & Sons, second edition, 1996; section 2.4 "one-way hash functions."*
Extended European Search Report dated Apr. 27, 2009.
Japan Office Action dated Sep. 3, 2009.
Japan Office Action dated Dec. 24, 2009.

* cited by examiner

*Primary Examiner* — Kaveh Abrishamkar
(74) *Attorney, Agent, or Firm* — Shimokaji & Assoc., P.C.

(57) ABSTRACT

A system for authenticating a serialized commodity is presented. A fixed identification, serial number, and authentication code are received for a serialized commodity to be checked for authenticity. A reference table is searched for an entry that matches the received fixed identification. In response to finding an entry in the reference table that matches the received fixed identification, a fixed identification key is retrieved from the reference table that is associated with the received fixed identification. A recreated authentication code is generated for the serialized commodity using the retrieved fixed identification key, the received fixed identification, and the received serial number. Then, it is determined whether the recreated authentication code matches the received authentication code. In response to determining that the recreated authentication code does match the received authentication code, an authentication code match message is outputted to authenticate the serialized commodity.

20 Claims, 6 Drawing Sheets

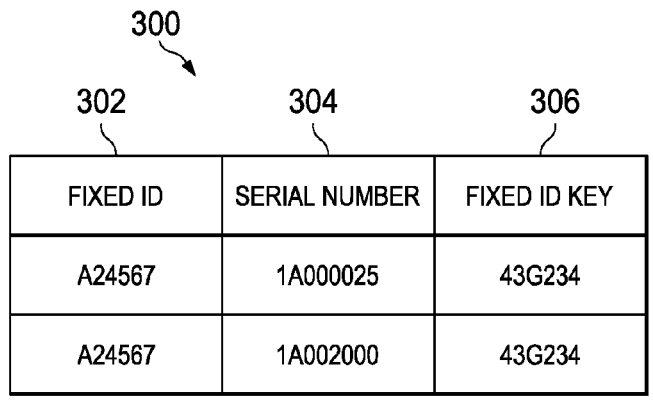
FIG. 3
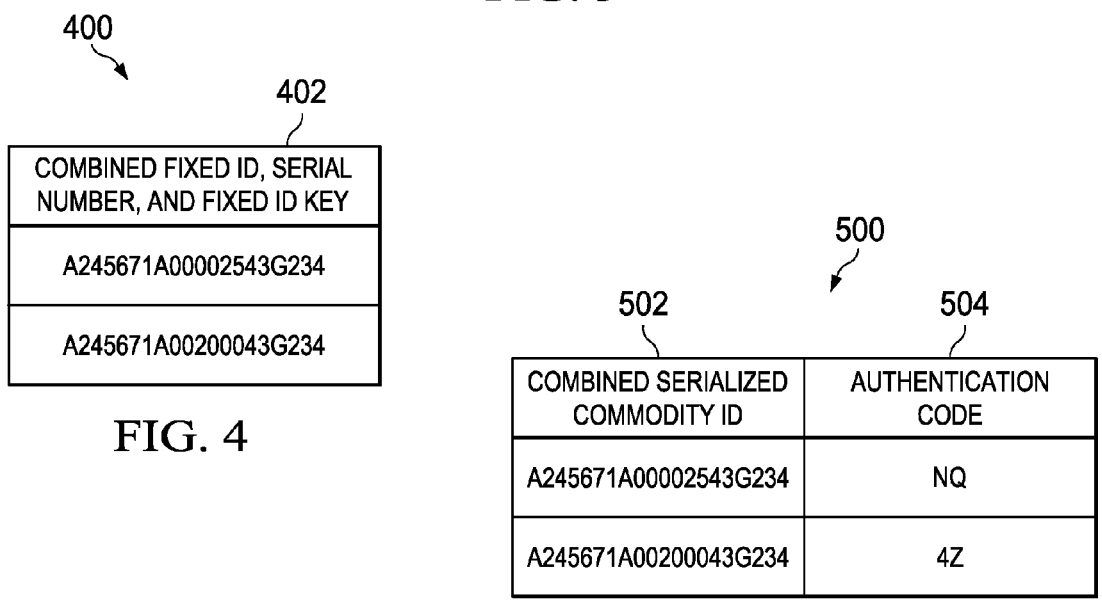
FIG. 4
FIG. 5
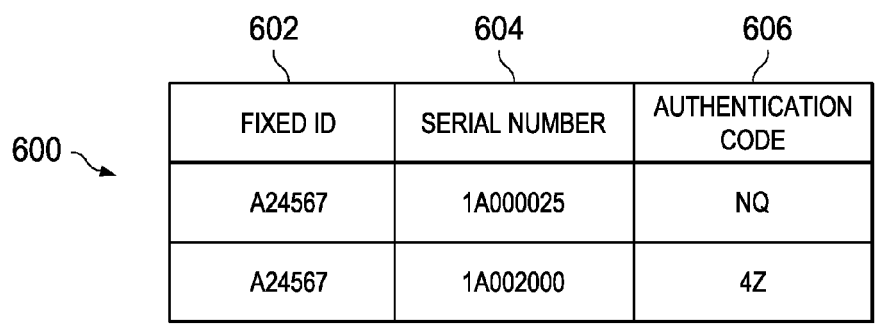
FIG. 6

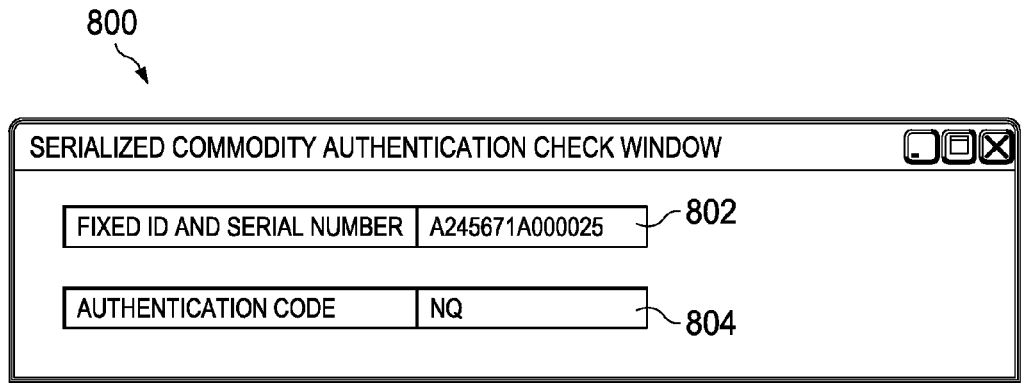

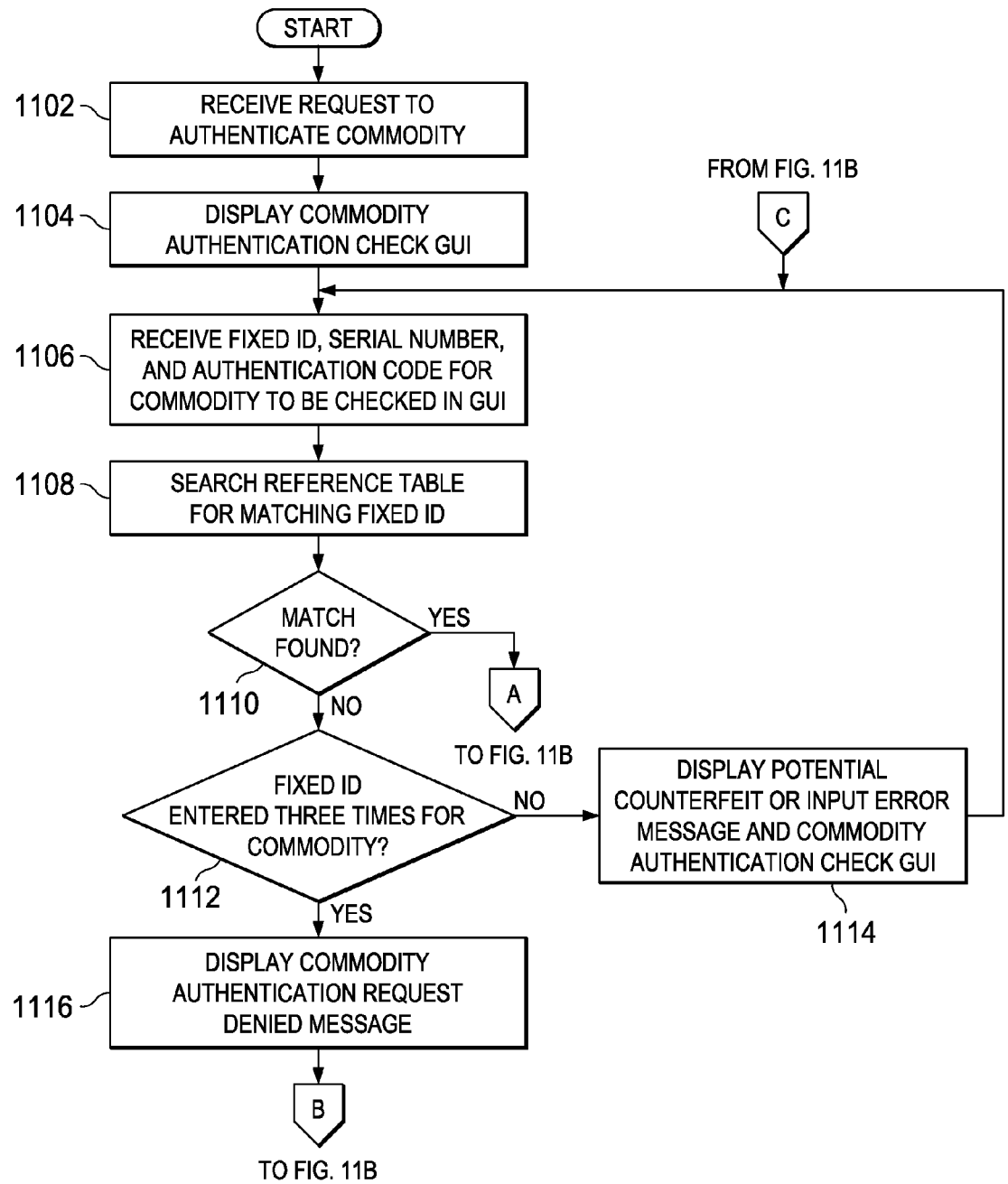

AUTHENTICATING SERIALIZED COMMODITIES

BACKGROUND OF THE INVENTION

1. Field of the Invention

The present invention relates generally to an improved data processing system and more specifically to a computer implemented method, system, and computer usable program code for authenticating serialized commodities.

2. Description of the Related Art

Today, counterfeiting, which is the illegal manufacturing and selling of brand copyright-protected commodities, is a huge and ever increasing threat to global businesses and organizations. Commodities, which are mass produced, are distributed to end users through sales and distribution channels. When these commodities have a particular value associated with them, counterfeiters often try to produce products that are copies of those produced by the original manufacturers. These counterfeit products are then introduced into the sales and distribution channels where end users become deceived regarding the source and quality of these goods. In addition, lost sales occur for the original manufacturer and the end user receives less value than expected. Serialized commodities are often the target of such counterfeiting activities.

BRIEF SUMMARY OF THE INVENTION

According to one embodiment of the present invention, a serialized commodity is authenticated. A fixed identification, serial number, and authentication code are received for a serialized commodity to be checked for authenticity. A reference table is searched for an entry that matches the received fixed identification. In response to finding an entry in the reference table that matches the received fixed identification, a fixed identification key is retrieved from the reference table that is associated with the received fixed identification. A recreated authentication code is generated for the serialized commodity using the retrieved fixed identification key, the received fixed identification, and the received serial number. Then, it is determined whether the recreated authentication code matches the received authentication code. In response to determining that the recreated authentication code does match the received authentication code, an authentication code match message is outputted to authenticate the serialized commodity.

BRIEF DESCRIPTION OF THE SEVERAL VIEWS OF THE DRAWINGS

FIG. 3 is an exemplary illustration of serialized commodity identifications in accordance with an illustrative embodiment;

FIG. 4 is an exemplary illustration of combined serialized commodity identifications in accordance with an illustrative embodiment;

FIG. 5 is an exemplary illustration of combined serialized commodity identifications with corresponding authentication codes in accordance with an illustrative embodiment;

FIG. 6 is an exemplary illustration of printed serialized commodity identifications with corresponding authentication codes in accordance with an illustrative embodiment;

FIG. 7 is an exemplary illustration of printed combined serialized commodity identifications with corresponding authentication codes in accordance with an illustrative embodiment;

FIG. 8 is an exemplary illustration of a serialized commodity authentication check window in accordance with an illustrative embodiment;

FIG. 9 is an exemplary illustration of a fixed identification key assigned to a fixed identification reference table in accordance with an illustrative embodiment;

FIGS. 11A and 11B are a flowchart illustrating an exemplary process for authenticating a serialized commodity in accordance with an illustrative embodiment.

DETAILED DESCRIPTION OF THE INVENTION

Figure 1:
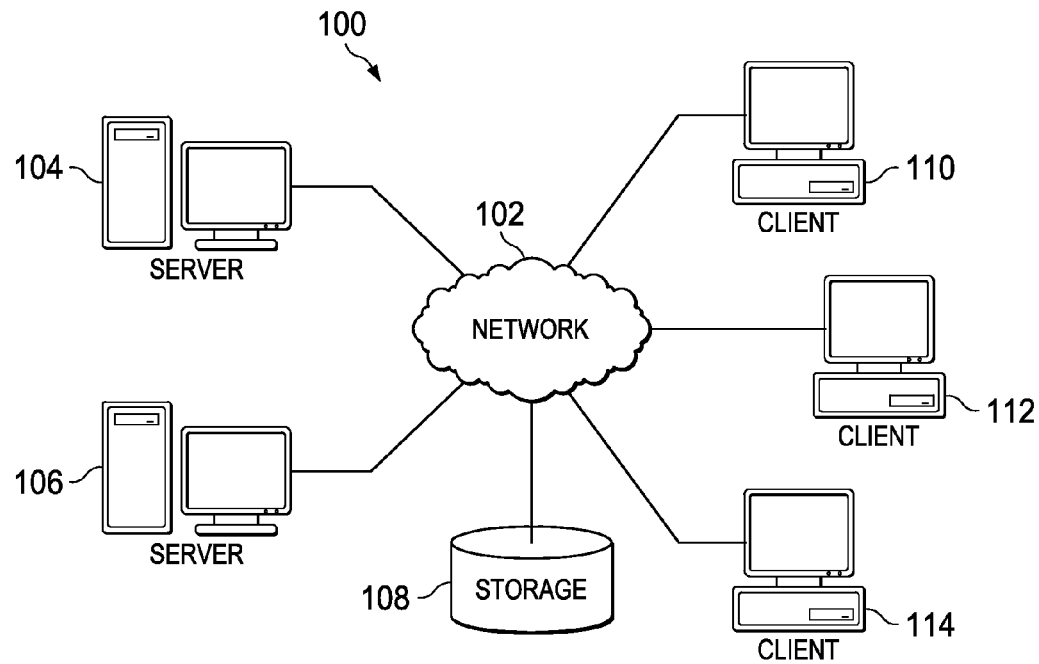
FIG. 1 is a pictorial representation of a network of data processing systems in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
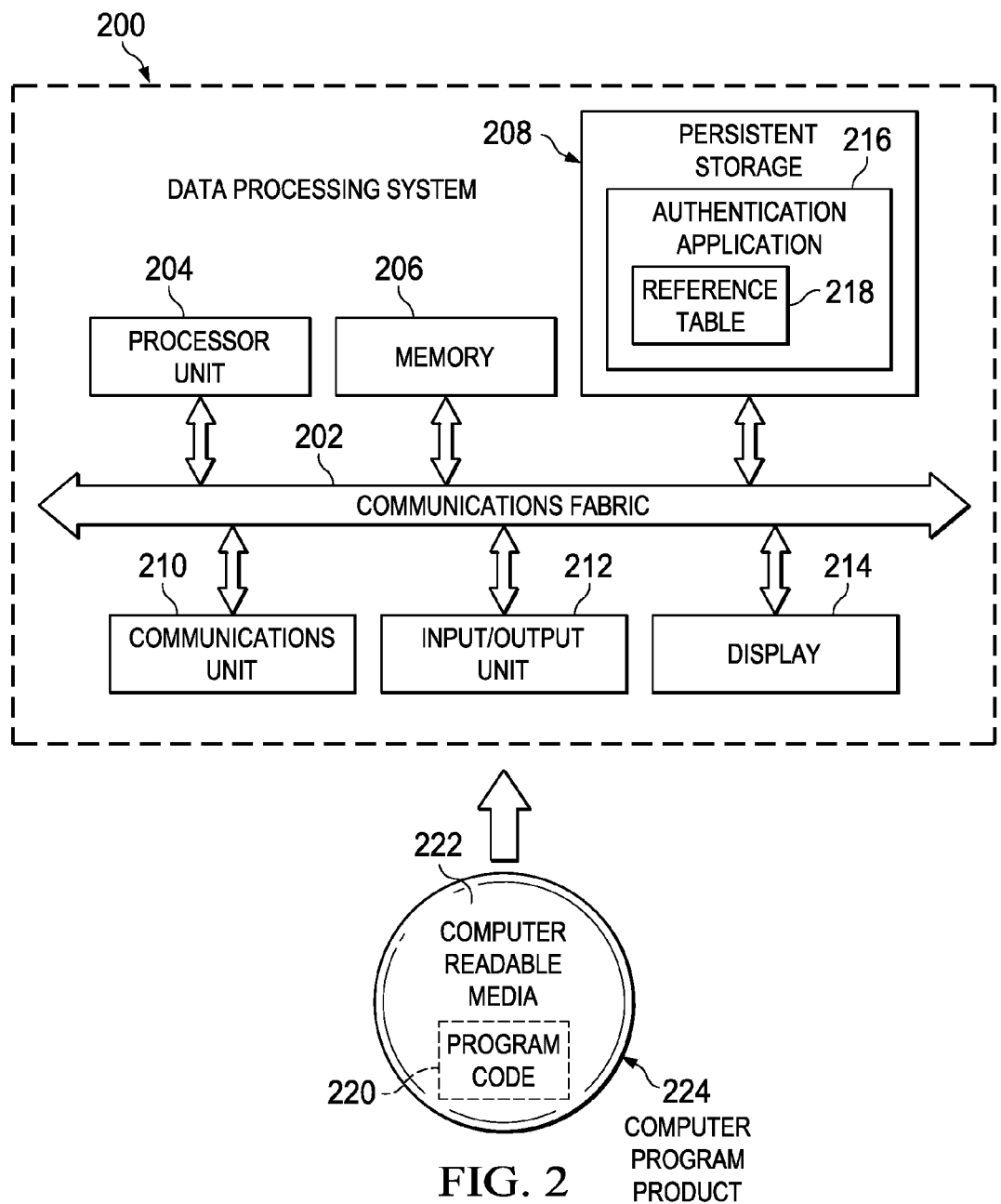
FIG. 2 is a diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may, for example, be personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is shown in which illustrative embodiments may be implemented. Data processing system 200 is an example of a data processing system, such as data processing system 112 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a transient basis and/or a persistent basis. Memory 206, in these examples, may, for example, be a RAM or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Persistent storage 208 includes authentication application 216. Authentication application 216 is a software application that a commodity owner may use to authenticate the authenticity of a serialized commodity. In other words, authentication application 216 is capable of determining whether a serialized commodity is a genuine article or a counterfeit article using identification data found on the commodity. This identification data may, for example, be one or more series of alphanumeric characters printed or impressed directly on the commodity, itself, or may be printed on a label, which is placed on the commodity. Serialized commodities may, for example, include physical products and parts, currency, bonds, stocks, checks, documents, tickets, licenses, passports, software, drugs, and raw materials. However, it should be noted that serialized commodities may include any type of manufactured commodity or article.

Authentication application 216 includes reference table 218. Reference table 218 is a table that contains the identification data for the serialized commodities. Authentication application 216 uses the identification data contained in reference table 218 to assist in the determination as to whether a serialized commodity is authentic or counterfeit.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through an alphanumeric keypad. Further, input/output unit 212 may send output to, for example, a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 220 is located in a functional form on computer readable media 222 that is selectively removable and may be loaded onto or transferred to data processing system 200 for execution by processor unit 204. Program code 220 and computer readable media 222 form computer program product 224 in these examples. In one example, computer readable media 222 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 222 also may take the form of a persistent storage, such as a hard drive, a thumb drive, or a flash memory that is connected to data processing system 200. The tangible form of computer readable media 222 is also referred to as computer recordable storage media. In some instances, computer readable media 222 may not be removable.

Alternatively, program code 220 may be transferred to data processing system 200 from computer readable media 222 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 222 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a systematic way to determine whether a serialized commodity is genuine or counterfeit. Illustrative embodiments enable a software application to remotely authenticate a serialized commodity without having to confirm any visual aspects of the commodity. The software application may, for example, be a web application located in a network server device. Alternatively, the software application may be located in a network client device or in a stand alone data processing system.

A serialized commodity is normally identified by a fixed identification (ID), plus a unique serial number, which is typically assigned by the manufacturer or commodity owner. The fixed ID may, for example, be a product ID or part number for a physical product, documentation, currency, or any other item that is serialized. The fixed ID identifies the type of commodity, whereas the serial number uniquely identifies a specific commodity item.

The software application, using known algorithms that provide various levels of security, may create a unique authentication code for a commodity on the sum of the fixed ID and serial number. Illustrative embodiments significantly increase the security level of the authentication code by introducing a secure fixed ID key, which the software application randomly generates and assigns to an associated fixed ID.

However, it should be noted that the generation and assigning of fixed ID keys may be performed by any method capable of being utilized by processes of illustrative embodiments. The commodity owner keeps the fixed ID keys, which are never identified on the commodities, as a business or company secret. In this way, it is nearly impossible for a counterfeiter to duplicate the authentication code of a commodity, even if the counterfeiter knows the algorithm used to generate the authentication code.

The software application creates a unique authentication code for each commodity serial number using an algorithm that incorporates the fixed ID, fixed ID key, and serial number. Then, the manufacturer applies the fixed ID, serial number, and authentication code to the commodity. It should be noted that the software application may combine the fixed ID and serial number.

To validate the authenticity of a fixed ID, serial number, and authentication code for a commodity, a user may, for example, manually input this data into a graphical user interface (GUI) provided by the software application. Alternatively, this data may be automatically input via, for example, radio frequency identification (RFID) or barcode scanning. After receiving this data, the software application searches an internal reference table for a matching fixed ID entry.

Subsequent to finding a matching fixed ID entry, the software application retrieves the associated fixed ID key from the reference table. Then, the software application recreates the authentication code using the retrieved fixed ID key and the input fixed ID and serial number. As a result, illustrative embodiments are not required to maintain a database (DB) that contains all authentication codes for all serialized commodities. In other words, illustrative embodiments do not track previously assigned authentication codes, but rather recreates authentication codes to verify authenticity of serialized commodities.

If a match exists between the recreated authentication code and the authentication code input into the software application, then the software application may, for example, output a message, such as "authentic," to a display device or a printer. If a match does not exist, then the software application may output a different message, such as "possible counterfeit."

In addition, the software application may record authentication requests for each commodity. Also, the software application may track when a warranty claim has been made to prevent multiple claims against a same serial number for a commodity. Further, the software application may limit or restrict the number of validation attempts against a serial number to prevent illicit code breaking activities. For example, the software application may limit the number of validation attempts to three. However, it should be noted that illustrative embodiments may utilize any predetermined number to limit how many times validation of a commodity may be attempted before denying the request.

Normally, costs per piece increase as the physical identification features for commodities become more elaborate or harder to counterfeit. However, illustrative embodiments do not significantly increase the piece price of a commodity because the cost to print the authentication code on the commodity is insignificant as a part and/or serial number is usually already printed on the commodity. In addition, the cost to purchase the software application is a one time investment, plus maintenance and running costs. Further, cost per item may decrease as the cost is spread over a large volume of commodities.

Moreover, training people to recognized physical anti-counterfeit features may be very difficult, may require special equipment, such as the pen used to detect counterfeit money, and results may vary depending on the training and skills of the person. In contrast, illustrative embodiments require very little training. Furthermore, with enough skill a counterfeiter may duplicate physical anti-counterfeit features to the point where it may be difficult to tell if the commodity is a counterfeit or not. Illustrative embodiments, by utilizing a secure fixed ID key, make it nearly impossible for a counterfeiter to correctly regenerate a commodity's authentication code.

With reference now to FIG. 3, an exemplary illustration of serialized commodity identifications is depicted in accordance with an illustrative embodiment. Serialized commodity identifications 300 include fixed IDs 302, serial numbers 304, and fixed ID keys 306. In this exemplary illustration, fixed IDs 302 are "A24567" for both commodities listed. In other words, both commodities listed are the same type of commodity. However, serial numbers 304 include serial number "1A000025" and serial number "1A002000," which indicate that the two commodities listed are different items of the same type.

Fixed ID keys 306 are associated with, or tied to, fixed IDs 302. In this exemplary illustration, fixed ID keys 306 are "43G234." It should be noted that fixed ID key "43G234" is only associated with fixed ID "A24567." However, it should also be noted that a different fixed ID key is generated and assigned to different fixed IDs. Further, it should be noted that fixed ID keys 306 are never printed or impressed on a serialized commodity.

With reference now to FIG. 4, an exemplary illustration of combined serialized commodity identifications is depicted in accordance with an illustrative embodiment. Combined serialized commodity identifications 400 includes combined fixed ID, serial number, and fixed ID key 402. In this exemplary illustration, combined fixed ID, serial number, and fixed ID key 402 includes combined serialized commodity identifications "A245671A00002543G234" and "A245671A00200043G234," which are the combination of fixed ID 302, serial number 304, and fixed ID key 306 in FIG. 3 for each of the two listed commodities.

With reference now to FIG. 5, an exemplary illustration of combined serialized commodity identifications with corresponding authentication codes is depicted in accordance with an illustrative embodiment. Combined serialized commodity identifications with corresponding authentication codes 500 includes combined serialized commodity identifications 502, such as combined fixed ID, serial number, and fixed ID key 402 in FIG. 4, and corresponding authentication codes 504. In this exemplary illustration, authentication code "NQ" was generated using a weighted checksum algorithm based on the combined serialized commodity identification "A245671A00002543G234" and authentication code "4Z" was generated using combined serialized commodity identification "A245671A00200043G234" using the same weighted checksum algorithm.

An authentication application, such as authentication application 216 in FIG. 2, may use an algorithm to create authentication codes 504 from combined serialized commodity identifications 502. One secure method to create authentication codes 504 is to use a two character weighted checksum. However, it should be noted that illustrative embodiments may utilize more than two characters in the weighted checksum. In addition, other secure methodologies may be used as well.

With reference now to FIG. 6, an exemplary illustration of printed serialized commodity identifications with corresponding authentication codes is depicted in accordance with an illustrative embodiment. Printed serialized commodity identifications with corresponding authentication codes 600 include fixed IDs 602, serial numbers 604, and authentication codes 606. Printed serialized commodity identifications with corresponding authentication codes 600 contain the necessary data for illustrative embodiments to validate the authenticity of serialized commodities.

Printed serialized commodity identifications with corresponding authentication codes 600 are printed on, or otherwise attached to, two different commodity items (i.e., different serial numbers) of the same commodity type (i.e., same fixed ID). It should be noted that serial number "1A000025" has a corresponding authentication code of "NQ" and serial number "1A002000" has a corresponding authentication code of "4Z" even though fixed ID 602 is the same (i.e., "A24567") for both of the serialized commodities listed. However, it should also be noted that in an alternative embodiment fixed IDs 602 and serial numbers 604 may be combined, such as in the exemplary illustration in FIG. 7. In addition, a fixed ID may not be required if a serialized commodity can be identified by other means, such as, for example, currency. Further, a fixed ID key may be created based on a combination of factors, such as including the date the serialized commodity was produced by a manufacturer.

With reference now to FIG. 7, an exemplary illustration of printed combined serialized commodity identifications with corresponding authentication codes is depicted in accordance with an illustrative embodiment. Printed combined serialized commodity identifications with corresponding authentication codes 700 includes combined fixed ID and serial numbers 702 and authentication codes 704. Illustrative embodiments combine the fixed ID and serial number of a commodity to produce combined fixed ID and serial numbers 702. In this exemplary illustration, combined fixed ID and serial number "A245671A000025" has a corresponding authentication code of "NQ," while combined fixed ID and serial number "A245671A002000" has a corresponding authentication code of "4Z."

With reference now to FIG. 8, an exemplary illustration of a serialized commodity authentication check window is depicted in accordance with an illustrative embodiment. Serialized commodity authentication check window 800 is an example of a GUI that a user may utilize to request validation of the authenticity of a serialized commodity. Upon receiving a request to authenticate a serialized commodity, an authentication application, such as authentication application 216 in FIG. 2, displays serialized commodity authentication check window 800 to the user.

Serialized commodity authentication check window 800 includes fixed ID and serial number entry field 802 and authentication code entry field 804. The user may manually input data into fixed ID and serial number entry field 802 and authentication code entry field 804 by using, for example, a keyboard, or may automatically input the necessary data by using, for example, an RFID or a barcode scanner. In this exemplary illustration, "A245671A000025" is entered into fixed ID and serial number entry field 802 and "NQ" is entered into authentication code entry field 804.

It should be noted that serialized commodity authentication check window 800 is only exemplary and not intended as a limitation on illustrative embodiments. Serialized commodity authentication check window 800 may also include other features and functions not shown, such as, for example, a submit button and a cancel button. In addition, serialized commodity authentication check window 800 may include an area for the authentication application to display messages to a user, such as, for example, "fixed ID and/or Serial Number not found, please reenter."

With reference now to FIG. 9, an exemplary illustration of a fixed identification key assigned to a fixed identification reference table is depicted in accordance with an illustrative embodiment. Reference table 900 may, for example, be reference table 218 in FIG. 2. Reference table 900 is located within an authentication application, such as authentication application 216 in FIG. 2. The authentication application utilizes reference table 900 to assist the authentication application in recreating the authentication code for a serialized commodity in order to authenticate the commodity.

Reference table 900 includes fixed IDs 902 and fixed ID keys 904. In this exemplary illustration, fixed IDs 902 list fixed IDs "A24567" and "A24668" for two different commodity types and fixed ID keys 906 list the associated fixed ID keys for the two different commodity types, which are "43G234" and "2P21A5," respectively. It should be noted that each fixed ID key is random and is not sequential to the fixed ID.

The authentication application uses the fixed ID portion of the serialized commodity identification data entered into an input field within a serialized commodity authentication check window, such as the fixed ID portion of the data entered into fixed ID and serialized number entry field 802 within serialized commodity authentication check window 800 in FIG. 8. In this exemplary illustration, the fixed ID portion is "A24567." The authentication application then searches reference table 900 for a matching entry in fixed ID 902. After finding the matching entry, the authentication application retrieves the associated fixed ID key from fixed ID key 904, which in this exemplary illustration is "43G234." Then, the authentication application uses the retrieved fixed ID key, along with the inputted data such as the fixed ID and serial number, to recreate the authentication code for the serialized commodity being checked for validity.

If the recreated authentication code matches the authentication code entered into an authentication code entry field, such as the authentication code "NQ" entered into authentication code entry field 804 in FIG. 8, within the serialized commodity authentication check window, then the authentication application returns a message, such as "code match—authentic." If the recreated authentication code does not match the authentication code entered into the authentication code entry field, then the authentication application returns a different message, such as "code mismatch—possible counterfeit."

Figure 10:
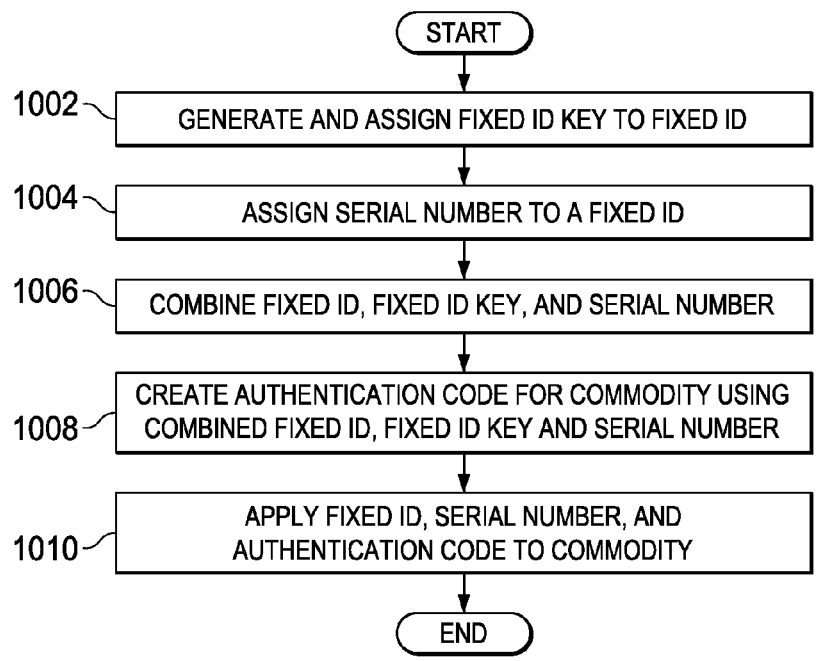
FIG. 10 is a flowchart illustrating an exemplary process for creating a fixed identification key and an authentication code for a serialized commodity in accordance with an illustrative embodiment.

With reference now to FIG. 10, a flowchart illustrating an exemplary process for creating a fixed ID key and an authentication code for a serialized commodity is shown in accordance with an illustrative embodiment. The assignment of the fixed ID key and authentication code to a serialized commodity may be performed and kept secret by the commodity owner regardless of who produces the commodity.

The process begins with the generation and assignment of a fixed ID key to a fixed ID (step 1002). Generation of the fixed ID key may be executed by an application using, for example, a random number generator. Then a serial number is assigned to the fixed ID, such as fixed IDs 302 and serial numbers 304 in FIG. 3 (step 1004). Then the application retrieves the fixed ID key based on the fixed ID and combines fixed ID, serial number, and fixed ID key (step 1006). It should be noted that the sequence of the combination is not significant and may be altered as needed by processes of illustrative embodiments.

Then, the application creates an authentication code, such as authentication codes 504 in FIG. 5, for the commodity using the combined fixed ID, fixed ID key, and serial number (step 1008). The creation of the authentication code may be performed by the commodity owner and then the authentication code may be communicated to the producer of the commodity, along with the fixed ID and the serial number of the fixed ID. Afterward, the producer applies the fixed ID, serial number, and authentication code to the commodity (step 1010). Application of the fixed ID, serial number, and authentication code may be accomplished by labeling, stenciling, printing, or other similar means. The process terminates thereafter.

Figure 11B:
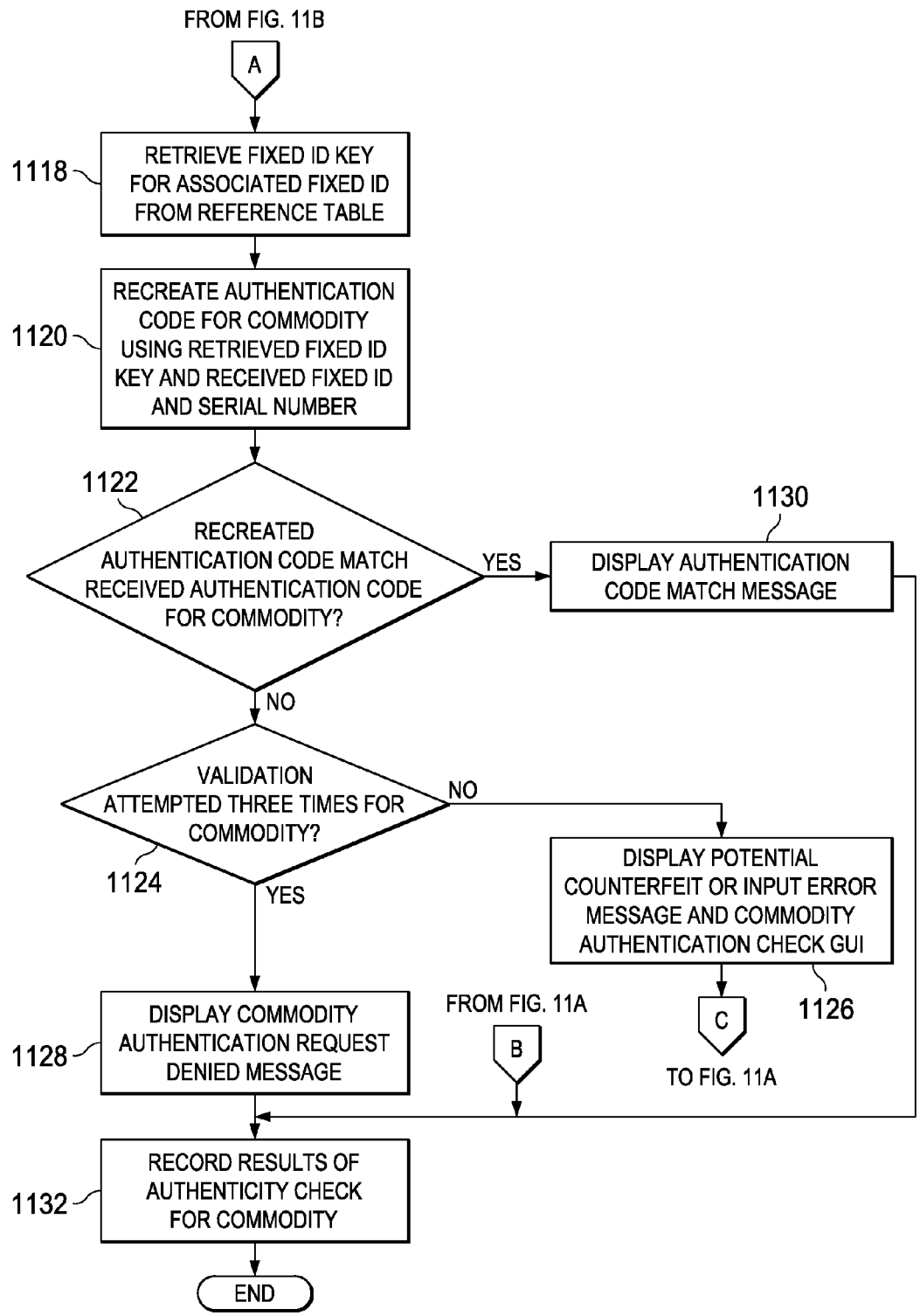

With reference now to FIGS. 11A and 11B, a flowchart illustrating an exemplary process for authenticating a serialized commodity is shown in accordance with an illustrative embodiment. The process shown in FIGS. 11A and 11B may be implemented in an authentication application, such as authentication application 216 in FIG. 2.

The process begins when the authentication application receives a request to authenticate a serialized commodity (step 1102). After receiving the request to authenticate the serialized commodity in step 1102, the authentication application displays a commodity authentication check GUI, such as commodity authentication check window 800 in FIG. 8, in a display device, such as display 214 in FIG. 2 (step 1104). Then, the authentication application receives a fixed ID, serial number, and authentication code, such as fixed IDs 602, serial numbers 604, and authentication codes 606 in FIG. 6, for the serialized commodity to be checked for authenticity in the commodity authentication check GUI (step 1106).

Subsequent to receiving the fixed ID, serial number, and authentication code in step 1106, the authentication application searches a reference table, such as reference table 900 in FIG. 9, for a matching fixed ID entry (step 1108). Then, the authentication application makes a determination as to whether a match was found between the received fixed ID and a fixed ID located within the reference table (step 1110). If a match was not found, no output of step 1110, then the authentication application makes a determination as to whether the fixed ID was entered three times for the serialized commodity (step 1112). If the fixed ID was not entered three times for the serialized commodity, no output of step 1112, then the authentication application displays a potential counterfeit or input error message, along with the commodity authentication check GUI (step 1114). Thereafter, the process returns to step 1106. If the fixed ID was entered three times for the serialized commodity, yes output of step 1112, then the authentication application displays a commodity authentication request denied message (step 1116) and the process proceeds to step 1132 thereafter.

Returning again to step 1110, if a match was found between the received fixed ID and a fixed ID located within the reference table, yes output of step 1110, then the authentication application retrieves a fixed ID key, such as fixed ID keys 904 in FIG. 9, for the associated fixed ID from the reference table (step 1118). Subsequently, the authentication application recreates the authentication code for the serialized commodity using the retrieved fixed ID key and the received fixed ID and serial number (step 1120). Then, the authentication application makes a determination as to whether the recreated authentication code matches the received authentication code for the serialized commodity (step 1122).

If the recreated authentication code does not match the received authentication code for the serialized commodity, no output of step 1122, then the authentication application makes a determination as to whether validation was attempted three times for the serialized commodity (step 1124). If validation was not attempted three times for the serialized commodity, no output of step 1124, then the authentication application displays a potential counterfeit or input error message, along with the commodity authentication check GUI (step 1126). Thereafter, the process returns to step 1106. If validation was attempted three times for the serialized commodity, yes output of step 1124, then the authentication application displays an authentication request denied message (step 1128) and the process proceeds to step 1132 thereafter.

Returning again to step 1122, if the recreated authentication code does match the received authentication code for the serialized commodity, yes output of step 1122, then the authentication application displays an authentication code match message (step 1130). Afterward, the authentication application records the results of the authenticity check for the serialized commodity (step 1132). The process terminates thereafter.

Thus, illustrative embodiments provide a computer implemented method, system, and computer program product for authenticating a serialized commodity. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for authenticating a serialized commodity comprising:
    causing a computer to receive a fixed identification, serial number, and authentication code for a serialized commodity to be checked for authenticity, without storing the fixed identification,
    wherein the serial number is attached to two different serialized commodity items of a same commodity type referenced by a same fixed identification;
    causing the computer to search a reference table for an entry that matches the received fixed identification;
    responsive to finding an entry in the reference table that matches the received fixed identification, retrieving a fixed identification key from the reference table that is associated with the received fixed identification, wherein the fixed identification key is identical to a second fixed identification key associated with a second received fixed identification for a second serialized commodity if the second received fixed identification is identical to the received fixed identification;
    responsive to determining that the entry in the reference table matches the received fixed identification after a first maximum number of attempts, causing the computer to generate a recreated authentication code for the serialized commodity using the retrieved fixed identification key, the received non-stored fixed identification, and the received non-stored serial number;
    altering the order of the retrieved fixed identification key, the received fixed identification, and the received serial number;
    causing the computer to determine whether the recreated authentication code matches the received authentication code;
    processing a second maximum number of attempts to match the received authentication code with the recreated authentication code for the given commodity; and
    responsive to determining that the recreated authentication code does match the received authentication code, outputting an authentication code match message to authenticate the serialized commodity.

2. The method of claim 1, further comprising:
    responsive to determining that the recreated authentication code does not match the received authentication code, outputting an authentication code mismatch message to identify a possible counterfeit serialized commodity;
    determining whether the fixed identification was entered a predetermined plurality of times for the serialized commodity to be checked for authenticity;
    outputting a message that the serialized commodity to be checked for authenticity is counterfeit if the fixed identification was not entered a predetermined plurality of times; and
    wherein the fixed identification comprises multiple series of alphanumeric characters.

3. The method of claim 1, further comprising:
    recording a result of a request to authenticate the serialized commodity.

4. The method of claim 1, further comprising:
    generating and assigning the fixed identification key to the fixed identification, wherein the fixed identification key is generated using a random number generator;
    assigning the serial number to the fixed identification;
    combining the fixed identification, the fixed identification key, and the serial number to form a combined fixed identification, fixed identification key, and serial number;
    creating the authentication code for the serialized commodity using the combined fixed identification, fixed identification key, and serial number, wherein the authentication code is created by a weighted checksum algorithm; and
    applying the fixed identification, the serial number, and the authentication code to the serialized commodity.

5. The method of claim 1, wherein the fixed identification is one of an alphanumeric part number or an alphanumeric product number that identifies a type of commodity, and wherein the serial number is an alphanumeric identifier that uniquely identifies an individual item, and wherein the authentication code is a two character code that is used to authenticate the serialized commodity.

6. The method of claim 1, wherein the fixed identification key is not placed on the serialized commodity and is kept a business secret.

7. The method of claim 1, wherein the reference table is located within an authentication application.

8. A data processing system for authenticating a serialized commodity, comprising:
    a bus system;
    a storage device connected to the bus system, wherein the storage device includes a set of instructions; and
    a processing unit connected to the bus system, wherein the processing unit:
        executes the set of instructions to receive a fixed identification, serial number, and authentication code for a serialized commodity to be checked for authenticity, wherein the serial number is attached to two different serialized commodity items of a same commodity type referenced by a same fixed identification;

searches a reference table for an entry that matches the received fixed identification;

tracks warranty claims against the serialized commodity;

retrieves a fixed identification key from the reference table that is associated with the received fixed identification in response to finding an entry in the reference table that matches the received fixed identification, wherein the fixed identification key is identical to a second fixed identification key associated with a second received fixed identification for a second serialized commodity if the second received fixed identification is identical to the received fixed identification;

generates a recreated authentication code for the serialized commodity using the retrieved fixed identification key, the received fixed identification, and the received serial number without creating a database that stores the received authentication codes or the recreated authentication codes;

determines whether the recreated authentication code matches the received authentication code; sends a message indicating a potential counterfeit where the authentication code was not checked for authentication a minimum predetermined number of times; and outputs an authentication code match message to a graphical user interface describing a counterfeit potential to authenticate the serialized commodity in response to determining that the recreated authentication code does match the received authentication code.

9. The data processing system of claim 8, wherein the processing unit executes a further set of instructions to output an authentication code mismatch message to identify a possible counterfeit serialized commodity in response to determining that the recreated authentication code does not match the received authentication code.

10. The data processing system of claim 8, wherein the processing unit executes a further set of instructions to record a result of a request to authenticate the serialized commodity.

11. The data processing system of claim 8, wherein the processing unit executes a further set of instructions to generate and assign the fixed identification key to the fixed identification, wherein the fixed identification key is generated using a random number generator; assign the serial number to the fixed identification; combine the fixed identification, the fixed identification key, and the serial number to form a combined fixed identification, fixed identification key, and serial number; create the authentication code for the serialized commodity using the combined fixed identification, fixed identification key, and serial number, wherein the authentication code is created by a weighted checksum algorithm; and apply the fixed identification, the serial number, and the authentication code to the serialized commodity.

12. The data processing system of claim 8, wherein the fixed identification is one of an alphanumeric part number or an alphanumeric product number that identifies a type of commodity, and wherein the serial number is an alphanumeric identifier that uniquely identifies an individual item, and wherein the authentication code is a two character code that is used to authenticate the serialized commodity.

13. The data processing system of claim 8, wherein the fixed identification key is not placed on the serialized commodity and is kept a business secret.

14. A computer program product for authenticating a serialized commodity, the computer program product comprising:

a non-transitory non-paper computer readable storage medium having computer readable program code embodied therewith, the computer readable program code operable to cause the computer to:

receive a fixed identification, serial number, and authentication code for a serialized commodity to be checked for authenticity, wherein the serial number is attached to two different serialized commodity items of a same commodity type referenced by a same fixed identification;

search a reference table for an entry that matches the received fixed identification;

retrieve a fixed identification key from the reference table that is associated with the received fixed identification in response to finding an entry in the reference table that matches the received fixed identification, wherein the fixed identification key is identical to a second fixed identification key associated with a second received fixed identification for a second serialized commodity if the second received fixed identification is identical to the received fixed identification;

generate a recreated authentication code for the serialized commodity using the retrieved fixed identification key from the reference table, the received fixed identification being received by user input to a graphical user interface, and the received serial number being received by user input to a graphical user interface;

determine whether the recreated authentication code matches the received authentication code without creating a database that stores the received authentication codes or the recreated authentication codes; and output an authentication code match message to authenticate the serialized commodity in response to determining that the recreated authentication code does match the received authentication code.

15. The computer program product of claim 14, further comprising:

computer usable program code configured to output an authentication code mismatch message to identify a possible counterfeit serialized commodity in response to determining that the recreated authentication code does not match the received authentication code.

16. The computer program product of claim 14, further comprising:

computer usable program code configured to record a result of a request to authenticate the serialized commodity.

17. The computer program product of claim 14, further comprising computer readable program code operable to cause the computer to:

generate and assign the fixed identification key to the fixed identification, wherein the fixed identification key is generated using a random number generator;

assign the serial number to the fixed identification;

combine the fixed identification, the fixed identification key, and the serial number to form a combined fixed identification, fixed identification key, and serial number;

create the authentication code for the serialized commodity using the combined fixed identification, fixed identification key, and serial number, wherein the authentication code is created by a weighted checksum algorithm; and
apply the fixed identification, the serial number, and the authentication code to the serialized commodity.

18. The computer program product of claim 14, wherein the fixed identification is one of an alphanumeric part number or an alphanumeric product number that identifies a type of commodity, and wherein the serial number is an alphanumeric identifier that uniquely identifies an individual item, and wherein the authentication code is a two character code that is used to authenticate the serialized commodity.

19. The computer program product of claim 14, wherein the fixed identification key is not placed on the serialized commodity and is kept a business secret.

20. The computer program product of claim 14, wherein the reference table is located in an authentication application.

* * * * *